US006904237B2

(12) United States Patent
Rasztovits-Wiech et al.

(10) Patent No.: US 6,904,237 B2
(45) Date of Patent: Jun. 7, 2005

(54) CIRCUIT FOR MEASUREMENT OF THE SIGNAL QUALITY IN DIGITAL OPTICAL FIBER TRANSMISSION NETWORKS BY INTERPRETING THE SIGNAL HISTOGRAM

(75) Inventors: Michael Rasztovits-Wiech, Vienna (AT); Klaus Studer, Blons (AT)

(73) Assignee: Siemens Aktiengesellschaft, Munich (DE)

( * ) Notice: Subject to any disclaimer, the term of this patent is extended or adjusted under 35 U.S.C. 154(b) by 257 days.

(21) Appl. No.: 09/862,090

(22) Filed: May 21, 2001

(65) Prior Publication Data

US 2002/0171885 A1 Nov. 21, 2002

(51) Int. Cl.[7] .......................... H04B 10/08; H04B 10/06
(52) U.S. Cl. ........................... 398/27; 398/25; 398/26; 398/202; 398/208
(58) Field of Search ................... 398/23–27, 182, 398/186, 187, 202–204, 210, 176, 278, 286, 287, 325, 208; 370/333; 375/227, 228; 702/180, 181, 179

(56) References Cited

U.S. PATENT DOCUMENTS

| 5,585,954 | A | | 12/1996 | Taga et al. | |
| 6,229,631 | B1 | * | 5/2001 | Sato et al. | 398/30 |
| 6,366,374 | B2 | * | 4/2002 | Bradshaw et al. | 398/17 |
| 6,396,601 | B1 | * | 5/2002 | Takara et al. | 398/9 |
| 2002/0048062 | A1 | * | 4/2002 | Sakamoto et al. | 359/124 |
| 2003/0023762 | A1 | * | 1/2003 | Ho et al. | 398/186 |

FOREIGN PATENT DOCUMENTS

EP     0 884 868     12/1998

OTHER PUBLICATIONS

"Bit error probability estimation algorithm for signal supervision in all–optical networks," Rasztovits–Wiech, M.; Studer, K.; Leeb, W.R.; Electronics Letters, vol.: 35, Issue: 20, Sep. 30, 1999 □□pp.: 1754–1755.*
"Application of amplitude histograms to monitor performance of optical channels," Hanik, N.; Gladisch, A.; Caspar, C.; Strebel, B.; Electronics Letters, vol. 35, Issue: 5, Mar. 4, 1999 □□pp. : 403–404.*
"Histogram method for identification and evaluation of crosstalk," Weinert, C.M.; Caspar, C.; Konitzer, M.; Rohde, M.; Electronics Letters, vol.: 36, Issue: 6, Mar. 16, 2000 □□pp.558–559.*
"Optical signal quality monitor using direct Q–factor measurement," Ohteru, S.; Takachio, N.;□□Photonics Technology Letters, IEEE, vol. 11, Issue: 10, Oct. 1999, □□pp.: 1307–1309.*

(Continued)

Primary Examiner—M. R. Sedighian
(74) Attorney, Agent, or Firm—Bell Boyd & Lloyd LLC

(57) ABSTRACT

In an optical fiber communication system, for signal monitoring a transparent optical network (all-optical networks), i.e. a system without digital intermediate regeneration, the bit error probability (BEP) is calculated by dismodulating and sampling the signal and generating an amplitude histogram. This histogram serves mainly for modeling the signal distortions. A family of amplitudes that represent the average of a noise-infested sub-signal is determined from the histogram for each status of the signal (logical "0" or "1"). The variance of the individual noise signal overlaid on every amplitude value is calculated from the parameters of the receiver as well as from the optical signal-to-noise ratio (OSNR). The bit error probability is calculated with adequate precision from these parameters.

1 Claim, 1 Drawing Sheet

OTHER PUBLICATIONS

"New Method of Analyzing Eye Patterns and Its Application to High-Speed Optical Transmission Systems," Nishimoto et al., J. of Lightwave Tech., vol. 6, No. 5, (May, 1988) pp. 678–685.

Margin Measurements in Optical Amplifier Systems, Bergano et al., IEEE Photonics Technology Letter, vol. 5, No. 3, (Mar. 1993) pp. 304–306.

"Wavelength Division Multiplexing," Laude, Chapter 3: Wavelength Division Multiplexing: Basic Principles, pp. 19–24 (1993).

HP 83480A Analyzer, HP 54750A Oscilloscope User's Guide, pp. 5–19, 5–20, 6–41, 6–42.

Optische Nachrichtentechnik, Leeb, Speech Transcript (1987).

"Digital Communication," Lee et al., Chapter 3: Stochastic Signal Processing, pp. 34–41 (1988).

* cited by examiner

CIRCUIT FOR MEASUREMENT OF THE SIGNAL QUALITY IN DIGITAL OPTICAL FIBER TRANSMISSION NETWORKS BY INTERPRETING THE SIGNAL HISTOGRAM

BACKGROUND OF THE INVENTION

1. Field of the Invention

The present invention is in the field of optical fiber communication systems, specifically directed to the problems of signal monitoring in networks of the type referred to as transparent optical networks (all-optical networks), i.e. systems without digital intermediate regeneration. The invention serves the purpose of monitoring, calculating or estimating the signal quality of optical signals in optical fiber communication systems in the form of the bit error probability or related quantities such as, for example, the Q-factor or the bit-to-error ratio.

2. Description of the Prior Art

Modern optical fiber communication networks operate according to the wavelength-division multiplex (WDM) principle (Laude, Wavelength Division Multiplexing, Prentice Hall, 1993). For cost reasons, the individual wavelength-division multiplex channels are no longer subjected to a complete digital regeneration in every network node but generally are only purely optically intensified, for example with the assistance of erbium-doped fiber amplifiers (EDFA). During the transmission, the generally binarily intensity-modulated signal is subject to different distortions such as, for example, chromatic dispersion and non-linearities of the optical fibers as well as to channel crosstalk. Further, the signal has the amplified spontaneous emission (ASE) of the optical amplifiers superimposed thereon.

Conventionally, only the ratio of the signal power of a channel to the spectral power density of the ASE, referred to as the optical signal-to-noise density ratio (OSNR—measurable with optical spectral analyzers) has been utilized as the criterion for the signal quality. Since the signal shape does not enter into the OSNR, an adequately precise statement about, for example, the bit error probability (BEP) thus cannot be made.

Another known method employs an optical receiver, i.e. conversion of the optical into an electrical signal, that is then sampled in the bit middle. As shown in FIG. 1 herein, an amplitude histogram is subsequently formed, the averages and variances of the two levels for "0" and "1" being subsequently determined therefrom either by forming the corresponding moments or by interpolation. The variances are allocated to the influence of Gaussian noise (Hewlett Packard Digital Communications Analyzer HP 83480 A, Users Guide, Hewlett Packard, 1995), which leads to a correct result in the calculation of the BEP only given completely undistorted and crosstalk-free signals.

SUMMARY OF THE INVENTION

In accordance with the invention, the variance of the noise is not determined from the histogram, but from the parameters of the receiver and from the OSNR. To that end, the optical signal-to-noise density ratio (OSNR) of the optical message signal to be investigated is measured, using optical spectral analyzers, discussed above, and further illustrated as reference 2 in FIG. 3. The optical signal is demodulated with the assistance of a photo-receiver, and a histogram of the occurring amplitude values is formed from the samples in a time window around the bit middle.

This histogram is employed for modeling the signal statistics by allocating different random processes to the respective amplitude classes, the standard deviation thereof being calculated from the OSNR, the optical signal power at the input of the photodetector, and parameters of the optical receiver, these parameters being electrical bandwidth of the receiver, bandwidth of the optical filter preceding the photodetector, equivalent spectral input noise current density of the electrical amplifier in the optical receiver, as well as dark current and sensitivity of the photodiode. The probability of a downward or upward transgression (crossing) of a selected threshold is calculated for each random process, and the bit error probability is ultimately determined from the sum of these probabilities.

DESCRIPTION OF THE PREFERRED EMBODIMENTS

Figure 2:
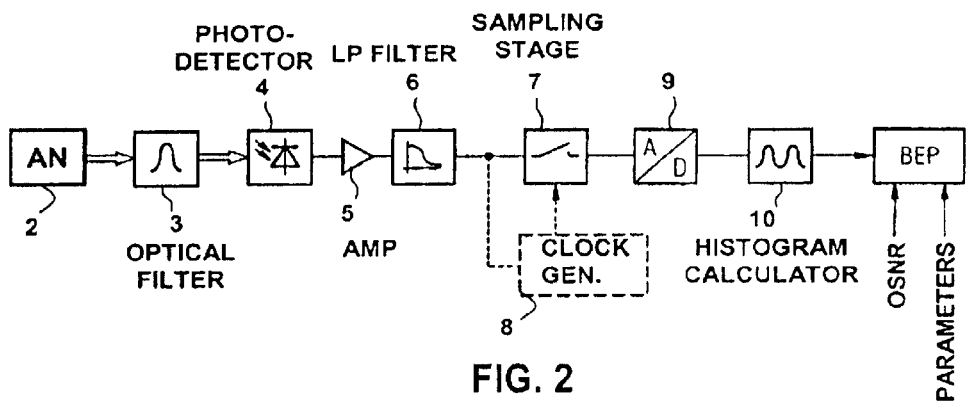
FIG. 2 shows an example of an optical receiver constructed and operating in accordance with the principles of the present invention.

In the optical receiver shown in FIG. 2, the binarily intensity-modulated signal of a single wavelength channel is selected from the wavelength division multiplex signal with the assistance of an optical filter (bandpass) 3 and is supplied to a photodetector 4, and thus is converted into an electrical, amplitude-modulated signal. Following an amplifier 5, this signal is band-limited with a low-pass filter 6. The bandwidth and transfer function of the low-pass filter 6 are suitably selected according to the data rate and signal shape of the signal to be investigated.

The band-limited signal is now sampled in a sampling stage 7 in the bit middle, with the clock 8 required for this purpose being acquired from the signal itself. Alternatively to sampling in the bit middle, a complete eye pattern (Lee, Messerschmidt, Digital Communication, Kluwer Academic Publishers, 1988) also can be registered, for example with the assistance of a sampling oscilloscope; however, only the values in the region of the largest aperture of the eye pattern are to be employed herein.

The analog signal is converted into a digital signal in an A/D converter 9, and a histogram 11 is formed from the digitalized samples in a histogram calculator 10. This histogram serves as the basis for the modeling of the distortions as described below. The averages of the sampled electrical signal $I_0$ and $I_1$ (current values here for simplification; further, the gain of the electrical amplifier 5 is assumed to be 1) are proportional to the optical powers corresponding to the logical states "0" and "1". Due to various noise processes (W. Leeb, script of the lecture Optische Nachrichtentechnik, Institut für Nachrichtentechnik und Hochfrequenztechnik, Technical University Vienna, 1997), $I_0$ and $I_1$ are—to a very good approximation—overlaid with Gaussian noise with the variance:

$$\sigma_0^2 = 2eB_{e1}(I_0 + I_D + 2N_{ASE}B_{opt}S) + (I_A^*)^2 B_{e1} + 4SI_0 N_{ASE}B_{e1} + 4S^2 N_{ASE}^2 B_{opt} B_{e1} \quad (1)$$

$$\sigma_1^2 = 2eB_{e1}(I_1 + I_D + 2N_{ASE}B_{opt}S) + (I_A^*)^2 B_{e1} + 4SI_1 N_{ASE}B_{e1} + 4S^2 N_{ASE}^2 B_{opt} B_{e1} \quad (2)$$

wherein $B_{e1}$ bandwidth of the low-pass $B_{opt}$ bandwidth of the optical filter preceding the photodetector e elementary charge (e=1.602·10$^{-19}$ As)

Figure 1:
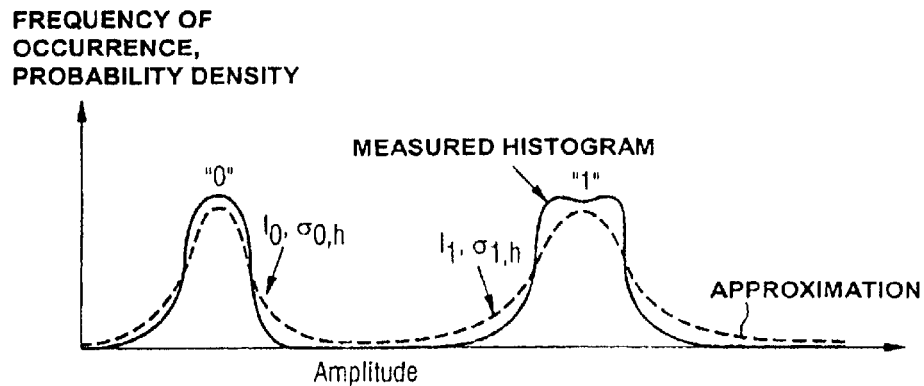
FIG. 1, as discussed above, shows an example of the difference between the measured amplitude distribution and the approximation according to the prior art.

$I_A^*$ equivalent spectral input noise current density of the electrical amplifier in the optical receiver $I_D$ dark current of the photodiode $N_{ASE}$ spectral power density in a polarization direction of the ASE of the optical amplifier S sensitivity of the photodiode In practice, however, different samples for $I_0$ and $I_1$ are obtained at every bit even in the theoretically noise-free case, due to distortions as well the momentary amplitude of noise signals. As a result, the variance $\sigma^2_{0,h}$ or $\sigma^2_{1,h}$ (as in the prior art, see FIG. 1) of $I_0$ and $I_1$ determined from the histogram by calculation of the $2^{nd}$ moment or interpolation are always greater than the variance of the noise according to Equations. 1 and 2.

The method disclosed herein is based on interpretation of the histogram to the effect that the discrete amplitude classes—referenced $I_{0,k}$ and $I_{1,k}$ (k=1,2, . . . K) below—correspond to the different amplitude values of a noise-free, real signal sampled in the bit middle. The variances $\sigma^2_{0,k}$ and $\sigma^2_{1,k}$ are calculated as in Eq. 1 (replace $I_0$ with $I_{0,k}$) or Eq. 2 (replace $I_1$ with $I_{1,k}$).

Figure 3:
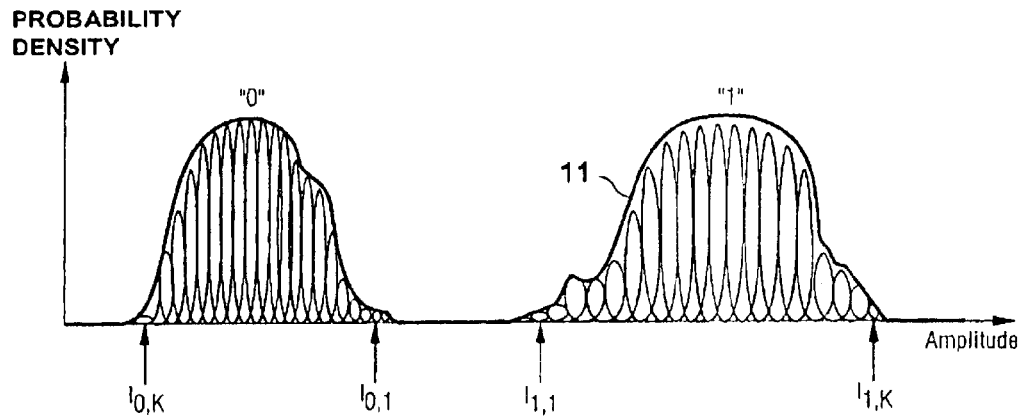
FIG. 3 illustrates the superposition of the random processes in accordance with the invention.

As shown in FIG. 3, the statistical properties of the noise infested signal are now modeled with the averages $I_{0,k}$ and $I_{1,k}$ and variances $\sigma^2_{0,k}$ and $\sigma^2_{1,k}$ by a superimposition of Gauss-distributed random processes $I_{0,k}$ and $I_{1,k}$.

The number of amplitude classes K to be selected is limited by the resolution of the A/D converter 9 and is based on the ratio $\sigma^2_{0,h}/\sigma^2_{0,k}$ or $\sigma^2_{1,h}/\sigma^2_{1,k}$. K is selected larger the higher this ratio is, whereby different values of K can be selected for $I_{0,k}$ and $I_{1,k}$, respectively. Since the measured histogram 11 also contains the distribution of the noise signal, at least a number of the amplitude classes that differ most extremely from zero on the distributions for 0 and 1 is to be discarded for enhancing the precision (for example, all amplitude classes with index k=1, 2, 3, K-2, K-1, K). The number of amplitude classes to be discarded is dependent on the ratio $\sigma^2_{0,h}/\sigma^2_{0,k}$ and $\sigma^2_{1,h}/\sigma^2_{1,k}$, on the resolution of the A/D converter 9 as well as on the total number of samples (the more amplitude classes with frequencies differing from zero, the more samples there are).

The BEP then is derived as the sum of the probabilities that $I_{0,k}$ or $I_{1,k}$ upwardly or downwardly transgresses a threshold a (decision threshold) (as described in the aforementioned Lee, Messerschmidt text) according to $$BEP = \frac{1}{2} \cdot \sum_k \left[ H(I_{0,k}) \cdot \text{erfc}\left(\frac{a - I_{0,k}}{\sqrt{2}\,\sigma_{0,k}}\right) + H(I_{1,k}) \cdot \text{erfc}\left(\frac{I_{1,k} - a}{\sqrt{2}\,\sigma_{1,k}}\right) \right] \quad (3)$$

wherein "0" and "1" are assumed to occur with equal frequency. The function erfc is the complementary error function and $H(I_{0,k})$ and $H(I_{1,k})$ respectively are the relative frequency of occurrence of the corresponding amplitude values to be calculated from the histogram, whereby $$\sum_k H(I_{0,k}) + H(I_{1,k}) = 1 \quad (4)$$

The decision threshold is best determined iteratively (BEP→min).

Although modifications and changes may be suggested by those skilled in the art, it is the intention of the inventors to embody within the patent warranted hereon all changes and modifications as reasonably and properly come within the scope of their contribution to the art.

We claim as our invention:

1. A circuit for identifying a bit error probability of an optical signal in an optical fiber communication system comprising:

an analyzer for determining an optical signal-to-noise ratio of an optical message signal, said optical message signal having a signal power;

a receiver supplied with said optical message signal for demodulating said optical message signal, said receiver including an optical filter having a bandwidth, a photodetector including a photodiode having a dark current and a sensitivity, and an amplifier having an equivalent spectral input noise current density, said receiver having an overall bandwidth and producing a demodulated signal with a plurality of amplitude values;

a histogram calculator supplied with said demodulated signal for calculating a histogram representing respective frequencies of occurrence of said amplitude values of said demodulated signal, each of said amplitude values being allocated to a different random process and each random process having an average value, and said histogram calculator calculating a standard deviation for each random process from said optical signal-to-noise ratio, said signal power, said overall bandwidth of said receiver, said bandwidth of said optical filter, said dark current of said photodiode and said sensitivity of said photodiode; and a bit error probability calculator which calculates a probability, based on said average value and said standard deviation for each random process, of each random process crossing a predetermined threshold, and which calculates a bit error probability for said optical message signal as a sum of the respective probabilities for the random processes.

\* \* \* \* \*